July 1, 1941. A. C. WINTEMBERG 2,247,458
RAILWAY TRUCK
Filed May 19, 1939 2 Sheets-Sheet 1

INVENTOR
A. C. WINTEMBERG
BY Rodney Bedell
ATTORNEY

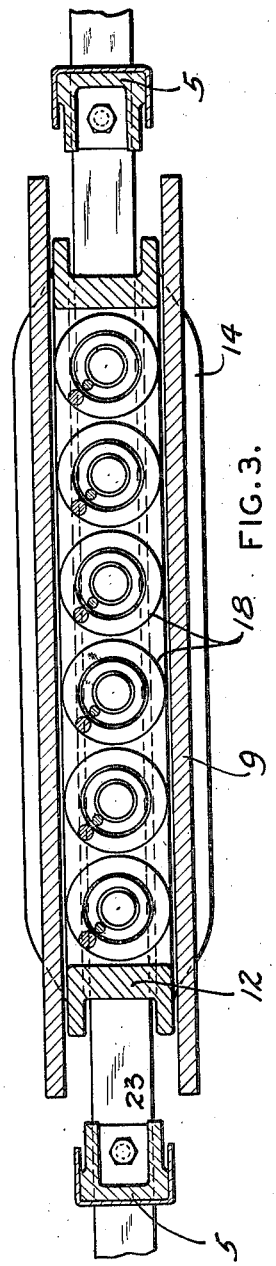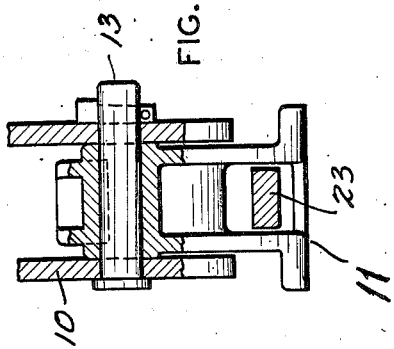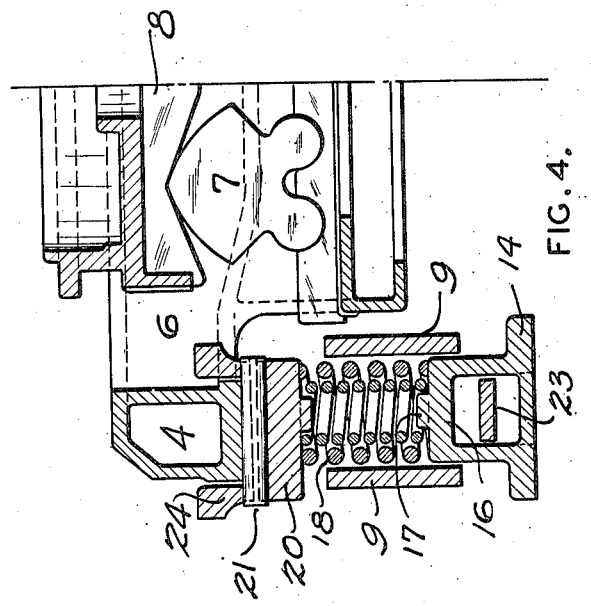

Patented July 1, 1941

2,247,458

UNITED STATES PATENT OFFICE 2,247,458

RAILWAY TRUCK

Adelbert C. Wintemberg, Drexel Hill, Pa., assignor to General Steel Castings Corporation, Granite City, Ill., a corporation of Delaware Application May 19, 1939, Serial No. 274,475

8 Claims. (Cl. 105—194)

The invention relates to railway rolling stock and more particularly to truck equalizer structure arranged to support the truck frame upon a pivot point intermediate the truck wheels but through a spring arrangement which is elongated between the truck wheels.

The main object of the invention is to mount the springs on a seat member carried by truck equalizers of ordinary construction.

Another object of the invention is to make the truck equalizer and spring seat unit of light weight for its load and materials which can be furnished economically.

These and other detailed objects of the invention are attained by the construction illustrated in the accompanying drawings in which Figure 1 is a top view of one longitudinal half of a 4 wheel truck.

Figure 3 is a horizontal section taken on the line 3—3 of Figure 2.

Figure 4 is a vertical transverse section taken on line 4—4 of Figure 2.

Figure 5 is a detailed vertical transverse section taken on the line 5—5 of Figure 2.

Figure 1:
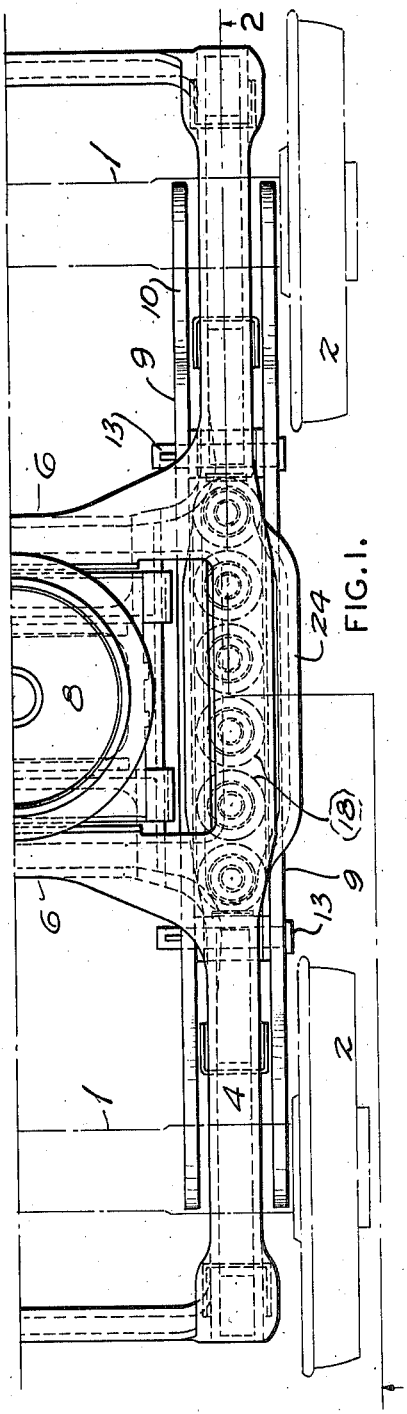
Figure 2:
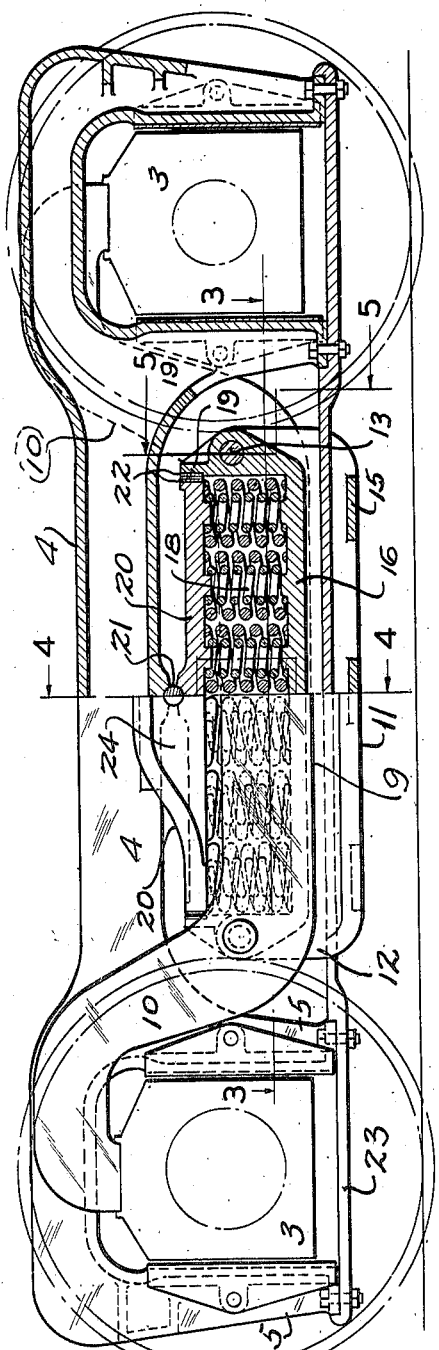
Figure 2 is in part a side elevation and in part a longitudinal vertical section and is taken on the line 2—2 of Figure 1.

The truck includes the usual axles 1, wheels 2, journal boxes 3 and frame 4 having pedestal legs 5 for slidably receiving journal boxes 3. The frame includes transoms 6 on which are mounted rockers 7 carrying the truck center bolster 8.

The truck frame and its load is supported from the journal boxes by the equalizer structures at opposite sides of the truck, each unit comprising a pair of depressed equalizer bars, an intermediate spring seat member, a plurality of coil springs and a spring cap. Each of the double equalizer bars includes a lower middle porton 9 and upwardly extending end portions 10 resting upon journal boxes 3 in the usual manner. Spring seat member 11 has upturned ends 12 secured to bars 9—10 by pins 13. Member 11 is of inverted U section (Figure 4) and its legs include outturned flanges 14. Ties 15 connect the legs at intervals.

This construction provides a strong structure, for the weight required, and because of the load applied near the bar supports makes it possible to use equalizer bars of relatively light sections throughout their length. Furthermore the bars may be of rolled or forged metal and the seat member only may be of heavier cast metal which arrangement will result in a lighter total than if the bar and seat be formed of a single cast metal unit.

The seat member base 16 includes bosses 17 for positioning the coil springs 18 and the upturned ends 12 of the seat member include brackets 19 for opposing the ends of the spring cap 20 which supports the truck frame through a cylindrical pin 21. Preferably the opposing faces of brackets 19 and cap 20 are provided with renewable wear plates 22 whereby the clearance between these parts may be maintained and the play of the cap longitudinally of the truck restricted.

The lower ends of all of the pedestal legs 5 are connected by a tie 23 which may be inserted lengthwise between the depending legs of member 11, and over cross ties 15 which would prevent tie 23 from dropping to the rail if its bolts should loosen or break.

With this construction the truck load is applied through springs 18 and seat member 11—12 to the equalizer bars at points on the latter adjacent the supports therefor on the journal boxes and the intermediate portions of the equalizer bars can be much lighter than if the springs were mounted directly upon the bars.

By removing pins 13 and tie 23 the seat member and the springs thereon may be removed and reapplied without removing the equalizer bars from the journal boxes or dropping the axles and wheels from the frame.

The elongated spring cap 20 is of U section, with its legs 24 receiving between them the longitudinal member 4 of the truck frame, to avoid against deflection vertically without elevating the truck frame in proportion to the depth of the spring cap. This U section makes possible the use of a spring cap member of relatively light cross sectional area and cooperates with the other structure described to produce an efficient equalizer structure for the amount of material used. The advantages of the construction are enhanced if a condition exists which makes desirable the use of a higher grade of material for the equalizer bars than the material for the intermediate seat and cap members.

The cross sectional contours, the manner of securing the parts to each other and other details of the structure may be varied without departing from the spirit of the invention and the exclusive use of such modifications as come within the scope of the claims is contemplated.

What is claimed is:

1. A railway truck equalizer structure comprising a pair of associated equalizer bars spaced apart with their end portions arranged to rest on the truck axle boxes, and a spring seat member of inverted U section positioned between and supported by said bars with its depending sides extending below the level of the bottoms of said bars and its cross piece forming a spring seat adjacent said level, and cross ties bracing the lower edges of the legs of said spring seat member at intervals whereby said seat member forms a box-shaped housing adapted to receive a pedestal tie extending from end to end of the seat member.

2. A railway truck equalizer structure comprising a pair of associated equalizer bars spaced apart with their end portions arranged to rest upon axle journal boxes, an elongated spring seat member of inverted U section positioned between said bars with its spaced sides extending below the same and terminating in out-turned flanges underlying said bars and with its cross piece forming a spring seat adjacent the level of the bottoms of said bars, said member having upturned ends of relatively narrow solid bar section between said equalizer bars, and removable pins extending transversely through said upturned ends and said equalizer bars for detachably mounting said seat member on said bars.

3. A railway truck equalizer structure comprising a pair of associated equalizer bars spaced apart with their end portions arranged to rest on the truck axle boxes, and a spring seat member of inverted U section positioned between and supported by said bars with its depending legs extending below the level of the bottoms of said bars and its cross piece forming a spring seat adjacent said level, said spring seat legs having out-turned flanges extending beneath the equalizer bars to increase the beam value of said seat member without unduly widening the space between the equalizer bars.

4. A railway truck equalizer structure comprising a pair of associated equalizer bars spaced apart with their ends arranged to rest upon axle journal boxes, said bars being depressed between their ends, and a member of relatively large width between and carried by said end portions and having an upper part forming a spring seat extending longitudinally throughout substantially the entire depressed portion of said bars and adjacent to the level of the bottoms of said bars, the central portion of said member being hollow to accommodate a pedestal tie bar and the lower portion of said member being widened and underlying said bars to provide reenforcement of the seat-forming part.

5. A railway truck equalizer structure comprising a pair of associated equalizer bars spaced apart with their end portions arranged to rest upon the truck axle boxes and with their intermediate portions depressed below the level of the end portions, and a member substantially shorter than said bars and positioned between them and supported thereon at its ends, said member being depressed between its ends with the top of the depressed portion located at a level close to the bottom of the depressed portions of said bars, the top of the intermediate portion of said member forming with said bars an upwardly opening channel for receiving truck frame supporting springs, said intermediate portion of said member projecting below the bottom of the depressed portions of said bars to a level in close proximity to the rail.

6. In a railway truck of the class described, spaced wheeled axles provided with journal boxes, wheel pieces extending between and over said axles and provided with pedestal jaws for receiving said boxes, said wheel pieces being depressed intermediate said jaws, and supporting structure for each of said wheel pieces comprising spaced equalizer bars with their ends resting upon said axle boxes and, between their ends, being depressed and extending substantially at the level of the bottoms of said boxes, and a member between said bars and supported at its ends by said bars adjacent to said boxes and forming a spring seat extending substantially throughout the length of the depressed portions of said bars and approximately at the same level as the bottoms of said bars, there being a plurality of springs carried along said member substantially throughout its length, and a cap resting on said springs and supporting the corresponding wheel piece, the lower portion of the spring seat being widened to underlie said equalizer bars and the spring cap having upwardly extending longitudinal flanges receiving between them the lower portion of said wheel piece, whereby the capacity of the wheel piece supporting structure is increased while the overall vertical extent of the wheel piece and equalizer bars intermediate the axle boxes is minimized.

7. In a railway truck, wheeled axles provided with axle boxes, equalizer structure including end portions arranged to rest on boxes at the same side of the truck, a spring seat member between said equalizers and connected at its end portions to portions of the equalizer spaced inwardly from its ends, springs carried by said member, a spring cap mounted on said springs and being of U shaped cross section, and a truck frame wheel piece received between the upstanding legs of said cap and supported on the equalizer structure, the bottom of said wheel piece being located at a level which is a substantial distance below the tops of said boxes.

8. In a locomotive, a four-wheel inside bearing swivel truck, having a lateral motion bolster, and a truck frame with the intermediate portion of the frame wheel piece depressed below its end portions, a pair of journal boxes at the side of the truck, a pair of equalizer bars spaced apart with their ends arranged to rest upon said boxes, springs carried by said bars and a spring cap mounted on said springs and having a U shaped cross section and adapted to receive the truck wheel piece between its legs and to support said truck frame at its central portion, said cap having a relatively narrow end portion extending between said bars and guided thereby in its vertical movement relative to said bars.

ADELBERT C. WINTEMBERG.